United States Patent Office 3,419,649
Patented Dec. 31, 1968

3,419,649
METHOD FOR MOULDING PIPES FROM CEMENTITIOUS MIXES
William D. Livingston, Box 6210, Nairobi, Kenya, and Ronald Frank King, Gordon Road, Thatcham, Berkshire, England
Filed Apr. 21, 1965, Ser. No. 449,805
Claims priority, application Great Britain, Apr. 27, 1964, 17,379/64
1 Claim. (Cl. 264—71)

ABSTRACT OF THE DISCLOSURE

A method of moulding pipe employing a cementitious mix and including the steps of assembling a pipe mould on a support surface, lifting the mould into a suspended position, supporting the mould in the suspended position while filling the mould with the cementitious mix and vibrating the mould while it is being filled, after the moulding of the pipe has been completed, placing the mould on a support plane and removing the mould from the pipe.

This invention relates to a method for moulding pipes, tubes or the like (hereinafter referred to collectively as pipes) from cementitious mix, and in particular to a method which facilitates full usage of the available moulding and storage space and obviates the possibility of damage to the product on removal from the mould by depositing the moulded pipe for storage at the moulding position.

Known methods of moulding pipes generally require that following the removal of the moulded pipe from the mould, which is in a fixed position, the moulded pipes are manually or mechanically transported to a curing or storage room. Such transportation of the moulded pipe before it has properly set often results in breakage and/or deformation of the moulded pipe.

It is the object of the present invention to overcome this disadvantage of the known method by providing a method in which the mould is adapted to be moved transversely and longitudinally to permit the mould to be moved over the floor space in a systematic manner in a number of moulding operations in which the mould is adapted to be raised and lowered in a vertical plane to permit each pipe, when moulded, to be deposited at the moulding position, and to provide a machine for carrying out the method according to the invention in which the mould comprising a core member, an outer casing surrounding the core member to provide an annular moulding space, a top closure member and a bottom closure member is adapted for lateral movement in both the transverse and longitudinal directions and for vertical movement.

The invention will be more clearly understood from the following description of a preferred embodiment thereof given by way of example only, with reference to the accompanying drawings in which.

Figure 1:
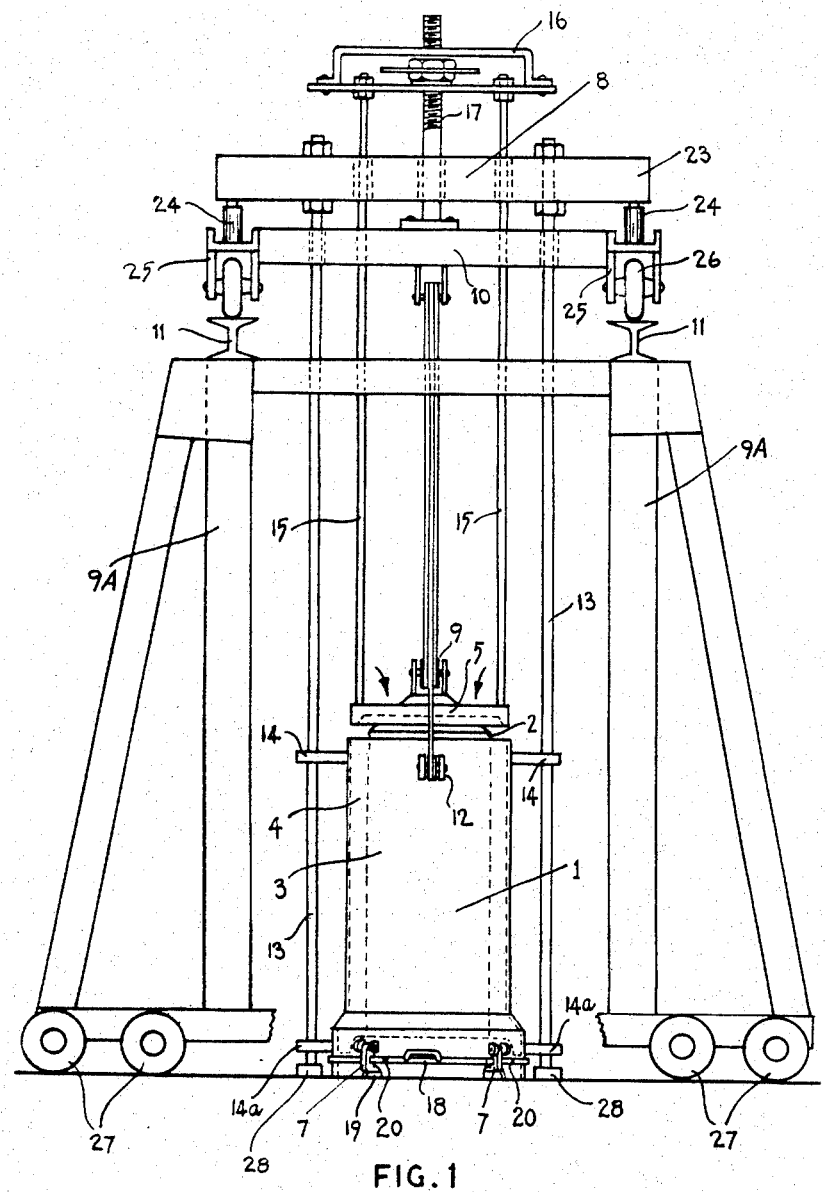
FIG. 1 is an end view of the machine prior to the commencement of the moulding operation.
Figure 2:
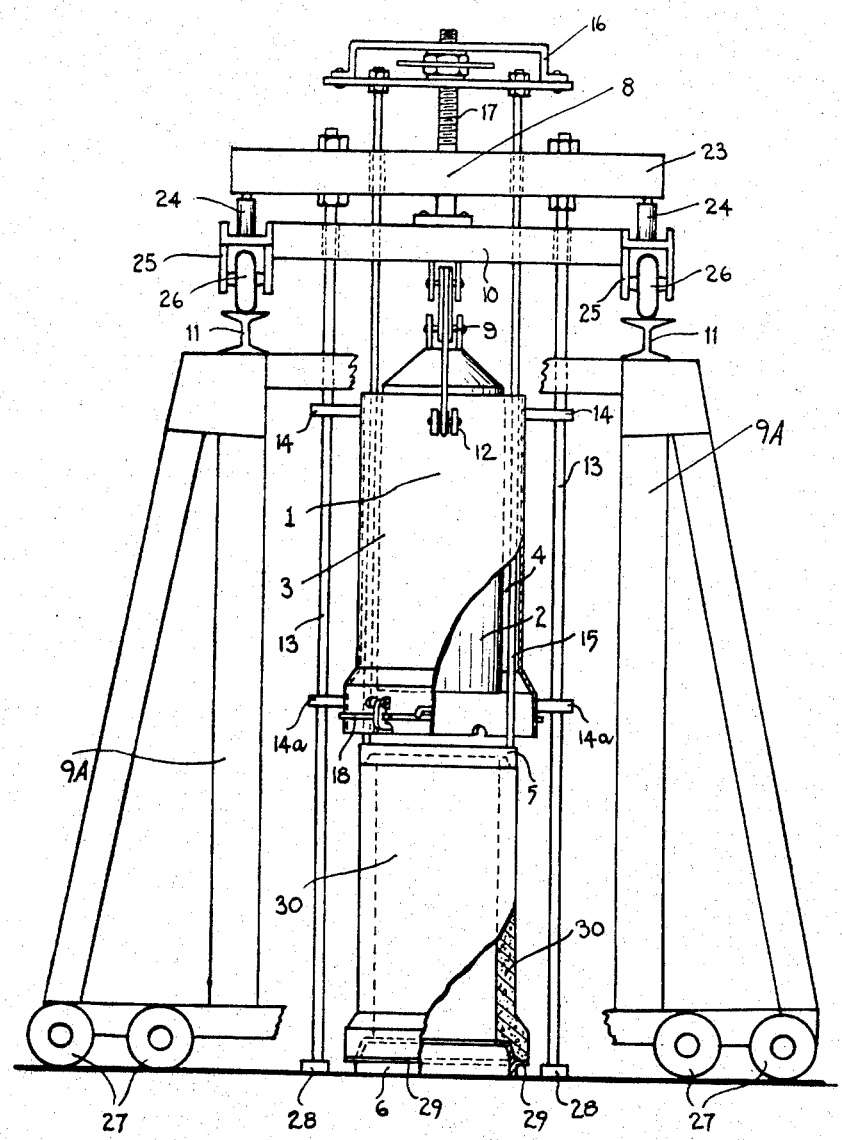
FIG. 2 is an end view of the machine at the end of the moulding operation, portion of the outer casing of the mould and of the moulded pipe being cut away for the sake of clarity.
Figure 3:
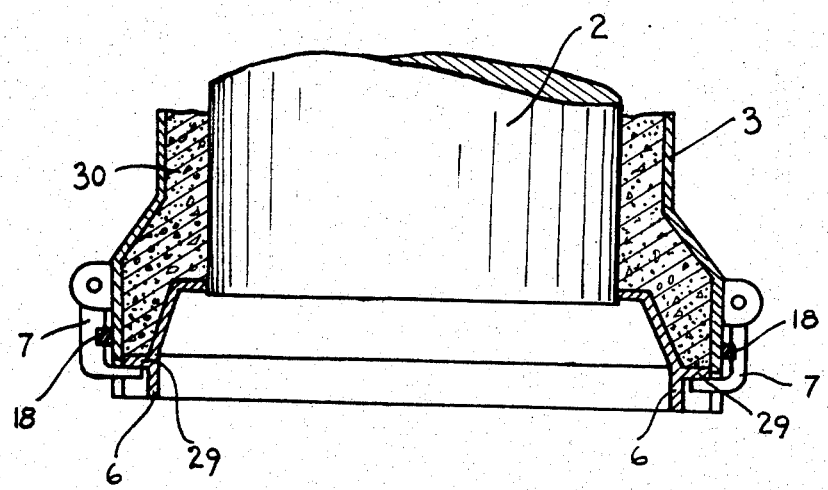
FIG. 3 is a detail in section of the bottom of the mould during the moulding operation.

Referring to the drawings the machine comprises a mould 1 having a nonrotatable core member 2, an outer casing 3 provided with vibrator means and surrounding the core member 2 to provide an annular moulding space 4, a top closure member 5 and a bottom closure member 6, the latter detachably connected by means of grips 7 to the bottom of the outer casing 3.

The core member 2 is suspended by means of an electrically driven pulley arrangement 9, from the lower cross member 10 of a movable gantry 8 mounted longitudinally on the rails 11 of a movable support structure 9A. In similar manner the outer casing 3 is suspended from the movable gantry 8 by means of an electrically driven pulley arrangement 12 and is, in addition, located by means of rigid guide bars 13 engaging guide members 14 and 14a fixedly secured to the exterior surface of the outer casing 3.

The top closure member 5 is rigidly attached by means of rigid bars 15 to a mounting 16 adjustably mounted on a vertical partially threaded bar 17 fixedly secured in turn to the lower cross-member 10 of the gantry 8. The bottom closure member 6 detachably connected to the outer casing 3 is released therefrom by turning a ring member 18 having projecting wedge pieces 20, clockwise, to force the grips 7 from the locating holes 19 of the closure member.

The gantry 8 comprises a cross-member 23 and the lower cross-member 10, the former being supported to two hydraulic jacks 24 located on the top of the fork members 25 of gantry wheels 26.

In operation the mould 1 is moved into the desired position either by movement of the gantry 8 on wheels 26 or by movement of the support structure 9A on wheels 27 depending as to whether longitudinal or transverse movement is required. A bottom closure member 6, recessed internally to form the socket end of the pipe and having a pipe support flange 29, is placed in the moulding position and then attached to the bottom of the outer casing, now lowered, by turning the ring member 18 anticlockwise to allow the grips 7 to locate holes 19.

The hydraulic jacks 24 are actuated to lift the guide bars 13, which in turn lift the core member 2, outer casing 3 and bottom closure member 6 by the action of end spuds 28 formed on the ends of the guide 13 on the lower guide members 14a of the outer casing 3. While maintaining the mould in the suspended position and applying a vibratory action to the outer casing 3, the cementitious mix is poured into the annular moulding space 4 until the moulding space is completely full.

By movement of the gantry mounting 16 on the bar 17, the top closure member 5, suitably recessed internally to from the spigot end of the pipe, is now lowered slightly to close the annular moulding space and, in addition, exert pressure on the cementitious mix. The cementitious mix is thus consolidated by the combined vibratory and pressure action applied thereto.

It is intended that the mould 1 be lifted out of contact with the ground before the vibratory action is applied as the transmission of the vibratory action to adjacent recently moulded pipes could result in deformation of said pipes. The vibratory action applied to the mould 1 in suspension is absorbed for practical purposes by the provision of pneumatic tyres on the wheels 26 and 27.

At the termination of the moulding process the mould 1 is lowered under the action of the hydraulic jacks 24 into contact with the ground and the bottom closure member detached as hereinbefore described, from the outer casing 3. The core member 2 is now withdrawn under the lifting action of the electrically driven pulley arrangement 9, the moulded pipe being maintained in position by the top closure member 5. In similar manner the outer casing 3 is stripped from the moulded pipe 30 by the lifting action of the electrically driven pulley arrangement 12, leaving the moulded pipe 30 supported at top and bottom by the top and bottom closure members 5 and 6 respectively.

The top closure member 5 is now lifted clear of the moulded pipe 30, to deposit the moulded pipe 30 supported on the bottom closure member 6 at its moulding position, while the mould 1 is moved on to the next moulding position on the floor.

In this manner, the whole floor space can be fully used and each moulded pipe deposited at its own moulding position, and allowed to set fully before being transported, thus obviating the likelihood of damage to the pipe before it is fully set.

We claim:

1. A method of moulding pipe from a cementitious mix deposited in a mould formed of top, bottom and side enclosing parts and comprising the steps of positioning and assembling the bottom and side enclosing parts of the mould on a stationary support plane in a first moulding position, lifting and vertically guiding the assembled parts of the mould in the axial direction thereof above the support plane and restraining the parts of the mould against lateral movement relative to the means suspending the mould, maintaining the mould in the suspended position and laterally restraining the mould during the moulding operation against movement relative to the means supporting the mould, filling the mould with a cementitious mix while in the suspended position and vibrating the mould during the filling operation for at least partially consolidating the cementitious mix being supplied thereto, placing the top enclosing part on the mould at the completion of the filling operation, applying pressure to the upper surface of the cementitious mix for consolidating the mix, after the completion of the moulding operation lowering and vertically guilding the mould back to the first moulding position on the stationary support plane while preventing lateral movement thereof, removing the top and side enclosing parts from the mould by lifting them upwardly from the position of the mould on the stationary support plane, and moving the top and side enclosing parts to another position on the support plane for repeating the moulding operation.

References Cited

UNITED STATES PATENTS

| | | | |
|---|---|---|---|
| 106,290 | 8/1870 | Skinner et al. | 25—37 |
| 118,880 | 9/1871 | Richardson | 25—30 |
| 737,843 | 9/1903 | Houts | 25—30 |
| 1,922,168 | 8/1933 | Lowell | 25—415 X |
| 2,926,411 | 3/1960 | Steiro | 25—30 |

ROBERT F. WHITE, *Primary Examiner.*

J. H. SILBAUGH, *Assistant Examiner.*

U.S. Cl. X.R.

25—30, 41